R. B. KEPNER.
Live-Bait Receptacle.
No. 163,498. Patented May 18, 1875.
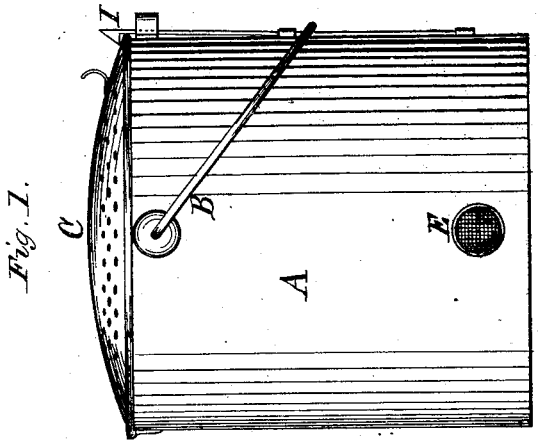
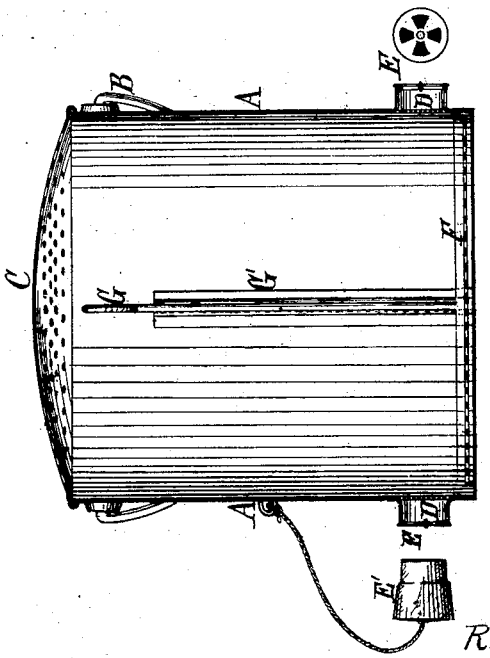
Witnesses:
Edwin James
John K. Jones
Inventor:
Robert B. Kepner,
per J. E. T. Holmead,
Attorney.

UNITED STATES PATENT OFFICE.

ROBERT B. KEPNER, OF WASHINGTON, DISTRICT OF COLUMBIA.

IMPROVEMENT IN LIVE-BAIT RECEPTACLES.

Specification forming part of Letters Patent No. 163,498, dated May 18, 1875; application filed April 22, 1875.

*To all whom it may concern:*

Be it known that I, ROBERT B. KEPNER, of Washington city and District of Columbia, have invented an Improved Live-Bait Bucket, of which the following is a full, clear, and exact description, reference being had to the accompanying drawing and the letters of reference marked thereon, making part of this specification, in which—

Figure 1 is a side elevation of my invention. Fig. 2 is a vertical cross-section of the same.

The object of my invention is to provide an improved device to preserve and transport bait for fishermen's and anglers' use, and that of the piscatorial fraternity generally, and prevent the necessity of obtaining fresh bait whenever it is desired to use it, as this causes a great deal of delay, and sometimes it cannot be obtained very easily.

My invention consists of a pail or bucket, of tin or other suitable material, having a bail or handle for transportation, and a perforated top for the admission of air.

In the sides of said pail are arranged, near the bottom, on opposite sides, two small orifices, covered with wire-netting, perforated metal, or other suitable material, to allow a free circulation of water, when it is desired to lower the pail into the water, which can be done by hanging it over the side of a boat, ship, or other suitable place.

The mouths of the orifices are provided with damper, or other suitable valves, to close them when transporting the pail from place to place.

In the inside of the pail is arranged a perforated false bottom, provided with a suitable handle to raise it when it is desired to separate any dead or worthless bait from the rest, and, by raising this false bottom with the bait thereon, it can be very easily done.

The construction and operation of my invention are as follows:

A represents the outer shell or main part of the pail, provided with a bail, B, for transporting it. The pail is covered by a perforated cover, C, the perforations in which, when closed, are fastened by means of a spring latch or catch, I. Near the lower surface of the pail are arranged tubular openings D D, and which are covered by cross-wires, wire-netting, or other material; and, while it will allow of a free circulation of water through the bucket when the tubular orifices are opened, will at the same time prevent the escape of the bait. These tubular openings D may be provided with a valve, E, cork E', or other suitable means for tightly closing the orifices, so as to prevent the escape of water when it is desired to transport the bucket and bait from place to place. F is a perforated false bottom, and is of such diameter as to allow of its fitting snugly and of moving freely when occasion requires it to be either elevated or lowered within the pail. This false bottom is provided with a long vertical handle or lifter, G, consisting of parallel rods bent into a link form. One of these rods or arms is attached to the false bottom, and the other rests and works in a vertical tubular guide-bearing, G'. The great advantage of this arrangement is, that it insures the elevating and lowering of the false bottom always in a level position, and thus prevent its tilting so as to catch or become locked within the pail. This false bottom is perforated, so as to allow the water to drain off when it is elevated, and it is desired to examine or separate the bait, or to clean out the pail.

The advantages of my invention will be readily appreciated by those acquainted with the troubles experienced in keeping bait fresh and sweet, and also the disadvantages in procuring bait very readily at some times. It is cheap, and not liable to get out of order.

What I claim as new, and desire to secure by Letters Patent of the United States, is—

1. The live-bait receptacle, consisting of the shell or bucket A, having tubular openings D D, protected by wire or wire-netting, perforated false bottom F, and handle or lifter G, the whole combined and arranged substantially as and for the purpose specified.

2. The shell or bucket A, having tubular openings D D, protected by wire or wire-netting, perforated false bottom F, handle or lifter G, and perforated cover C, the whole combined and arranged substantially as and for the purpose specified.

3. A live-bait bucket, consisting of the shell A, having tubular openings or perforations D D, suitably protected, perforated false bottom F, handle or lifter G, perforated cover C, and spring-latch, the whole constructed, combined, and arranged to operate substantially as described, and for the purpose specified.

In testimony whereof I have signed my name to this specification in the presence of two subscribing witnesses.

ROBT. B. KEPNER.

Witnesses:
   EDWIN JAMES,
   JOS. T. K. PLANT.